(12) United States Patent
Xiao et al.

(10) Patent No.: US 10,686,560 B2
(45) Date of Patent: Jun. 16, 2020

(54) QUICK RLC RETRANSMISSION ON HARQ FAILURE DURING TUNE AWAY

(71) Applicant: QUALCOMM Incorporated, San Diego, CA (US)

(72) Inventors: Gang Andy Xiao, San Diego, CA (US); Ashwini Raina, San Diego, CA (US); Shailesh Maheshwari, San Diego, CA (US); Rudhir Upretee, San Diego, CA (US); Mohan Krishna Gowda, San Diego, CA (US); Bao Vinh Nguyen, San Diego, CA (US); Deepak Krishnamoorthi, San Diego, CA (US); Prasad Kadiri, San Diego, CA (US); Pavan Kaivaram, San Diego, CA (US); Chintan Shirish Shah, San Diego, CA (US); Meric Uzunoglu, San Diego, CA (US); Aziz Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/746,533

(22) Filed: Jun. 22, 2015

(65) Prior Publication Data
US 2015/0372788 A1    Dec. 24, 2015

Related U.S. Application Data

(60) Provisional application No. 62/015,946, filed on Jun. 23, 2014.

(51) Int. Cl.
*H04L 1/08* (2006.01)
*H04L 1/18* (2006.01)
(Continued)

(52) U.S. Cl.
CPC .............. *H04L 1/08* (2013.01); *H04L 1/1812* (2013.01); *H04L 1/1887* (2013.01);
(Continued)

(58) Field of Classification Search
CPC ... H04L 1/1887; H04L 1/1854; H04L 1/1812; H04L 1/1816; H04L 43/0829; H04L 1/18;
(Continued)

(56) References Cited

U.S. PATENT DOCUMENTS 5,778,175 A * 7/1998 Paul ...................... H04L 12/413
709/235
9,380,643 B2 * 6/2016 Su ......................... H04W 88/06
(Continued)

FOREIGN PATENT DOCUMENTS

CN           1956393 A        5/2007
JP        2011527859 A       11/2011
(Continued)

OTHER PUBLICATIONS

International Search Report and Written Opinion—PCT/US2015/037109—ISA/EPO—dated Sep. 11, 2015.

*Primary Examiner* — April Y Blair
*Assistant Examiner* — Sazzad Hossain
(74) *Attorney, Agent, or Firm* — Patterson & Sheridan, LLP

(57) ABSTRACT

Certain aspects of the present disclosure provide techniques and apparatus for quick radio link control (RLC) retransmission on hybrid automatic repeat request (HARQ) failure during tune away. According to certain aspects, a method for wireless communications is provided. The method generally includes performing communications with a base station (BS) using radio components tuned to a first air interface, detecting a tune-away of the radio components from the first air interface to a second air interface while performing the (Continued)

communications, and scheduling one or more packets for retransmission to the BS upon completion of the tune-away, wherein the one or more packets are one or more packets that failed to be transmitted due to the tune-away.

25 Claims, 8 Drawing Sheets

(51) Int. Cl.
*H04W 36/02* (2009.01)
*H04W 76/28* (2018.01)
H04W 76/25 (2018.01)
H04W 84/04 (2009.01)
H04L 12/26 (2006.01)

(52) U.S. Cl.
CPC ........... *H04W 36/02* (2013.01); *H04W 76/28* (2018.02); *H04L 1/18* (2013.01); *H04L 1/1816* (2013.01); *H04L 1/1854* (2013.01); *H04L 43/0829* (2013.01); *H04W 76/25* (2018.02); *H04W 84/042* (2013.01)

(58) Field of Classification Search
CPC ...... H04L 1/08; H04W 84/042; H04W 36/02; H04W 76/045; H04W 76/28; H04W 76/25
USPC .......................................... 714/748, 749, 776
See application file for complete search history.

(56) References Cited

U.S. PATENT DOCUMENTS

| | | |
|---|---|---|
| 9,408,162 B2 | 8/2016 | Ho et al. |
| 2005/0265301 A1* | 12/2005 | Heo ..................... H04L 1/0025 370/349 |
| 2007/0086532 A1* | 4/2007 | Ferchland ............. H04L 1/1867 375/259 |
| 2007/0291695 A1* | 12/2007 | Sammour .............. H04W 36/02 370/331 |
| 2008/0022178 A1* | 1/2008 | Kim ..................... H04L 1/1678 714/748 |
| 2008/0310313 A1* | 12/2008 | Maheshwari ......... H04L 1/1867 370/241 |
| 2011/0158186 A1* | 6/2011 | Shihab .................. H04L 1/1854 370/329 |
| 2011/0179329 A1* | 7/2011 | Kim ..................... H04L 1/1825 714/748 |
| 2012/0322504 A1* | 12/2012 | Chou .................... H04W 36/14 455/558 |
| 2013/0010687 A1* | 1/2013 | Gaal ..................... H04W 72/082 370/328 |
| 2013/0083753 A1* | 4/2013 | Lee ...................... H04W 4/0833 370/329 |
| 2013/0244590 A1 | 9/2013 | Nukala et al. |
| 2014/0119293 A1 | 5/2014 | Sikri et al. |
| 2014/0120925 A1 | 5/2014 | Kanthala et al. |
| 2014/0219184 A1* | 8/2014 | Makharia .............. H04W 68/12 370/329 |
| 2014/0222748 A1* | 8/2014 | Mermoud ............. H04L 41/142 706/52 |

FOREIGN PATENT DOCUMENTS

| | | |
|---|---|---|
| WO | WO-2010006008 A2 | 1/2010 |
| WO | WO-2011088468 A1 | 7/2011 |
| WO | WO-2012044850 A1 | 4/2012 |
| WO | WO-2013142524 A1 | 9/2013 |

* cited by examiner

QUICK RLC RETRANSMISSION ON HARQ FAILURE DURING TUNE AWAY

CROSS-REFERENCE TO RELATED APPLICATIONS

This application claims benefit of U.S. Provisional Patent Application Ser. No. 62/015,946, filed Jun. 23, 2014, which is herein incorporated by reference in its entirety.

BACKGROUND

Field of the Disclosure

The present disclosure relates generally to wireless communication, and more particularly, to quick radio link control (RLC) retransmission on hybrid automatic repeat request (HARQ) failure during tune away.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide techniques and apparatus for quick radio link control (RLC) retransmission on hybrid automatic repeat request (HARQ) failure during tune away.

Certain aspects provide a method for wireless communications by a user equipment (UE). The method generally includes performing communications with a base station (BS) using radio components tuned to a first air interface, detecting a tune-away of the radio components from the first air interface to a second air interface while performing the communications, and scheduling one or more packets for retransmission to the BS upon completion of the tune-away, wherein the one or more packets are one or more packets that failed to be transmitted due to the tune-away.

Certain aspects provide an apparatus for wireless communications by a UE. The apparatus generally includes means for performing communications with a BS using radio components tuned to a first air interface, means for detecting a tune-away of the radio components from the first air interface to a second air interface while performing the communications, and means for scheduling one or more packets for retransmission to the BS upon completion of the tune-away, wherein the one or more packets are one or more packets that failed to be transmitted due to the tune-away.

Certain aspects provide an apparatus for wireless communications by a UE. The apparatus generally includes at least one processor configured to perform communications with a BS using radio components tuned to a first air interface, detect a tune-away of the radio components from the first air interface to a second air interface while performing the communications, and schedule one or more packets for retransmission to the BS upon completion of the tune-away, wherein the one or more packets are one or more packets that failed to be transmitted due to the tune-away.

Certain aspects provide a computer readable medium having computer executable code stored thereon. The computer executable code generally includes code for performing communications with a BS using radio components tuned to a first air interface, code for detecting a tune-away of the radio components from the first air interface to a second air interface while performing the communications, and code for scheduling one or more packets for retransmission to the BS upon completion of the tune-away, wherein the one or more packets are one or more packets that failed to be transmitted due to the tune-away.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
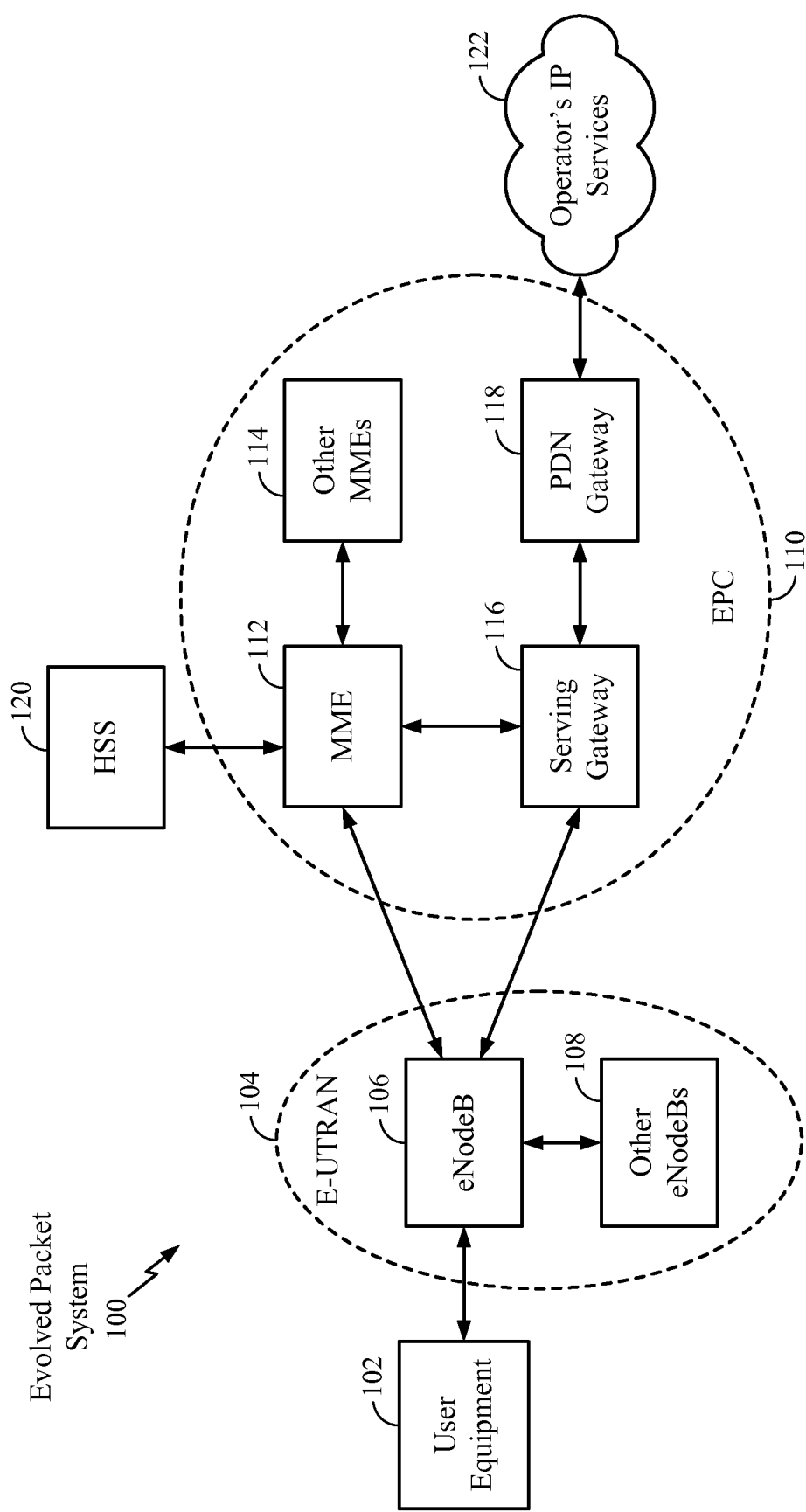
FIG. 1 is a diagram illustrating an example of a network architecture, in accordance with certain aspects of the present disclosure.

Certain aspects of the present disclosure provide techniques and apparatus for quick radio link control (RLC) retransmission on hybrid automatic repeat request (HARQ) failure during tune away. A user equipment (UE) may tune away may occur during HARQ communications. In this case, it may take time before the failure is recognized by the base station and a request for retransmission is sent. In certain systems, this time delay may disproportionately degrade performance. One potential solution to this problem may involve retransmitting all the packets that were carried on transport block associated with a failed, or potentially failed, transmission or retransmission as soon as an uplink grant becomes available. This method may reduce round trip time and mitigate performance degradation.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

An Example Wireless Communications System

FIG. 1 is a diagram illustrating an LTE network architecture 100 in which aspects of the present disclosure may be performed. For example user equipment (UE) 102 may perform hybrid automatic repeat request (HARQ) communications with eNB 106 using radio components tuned to a first air interface. UE 102 may detect a tune-away of the radio components from the first air interface to a second air interface while performing the HARQ communications and, upon completion of the tune-away, the UE 102 may schedule one or more packets for retransmission to the eNB 106 that failed to be transmitted due to the tune-away to the eNB 106.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
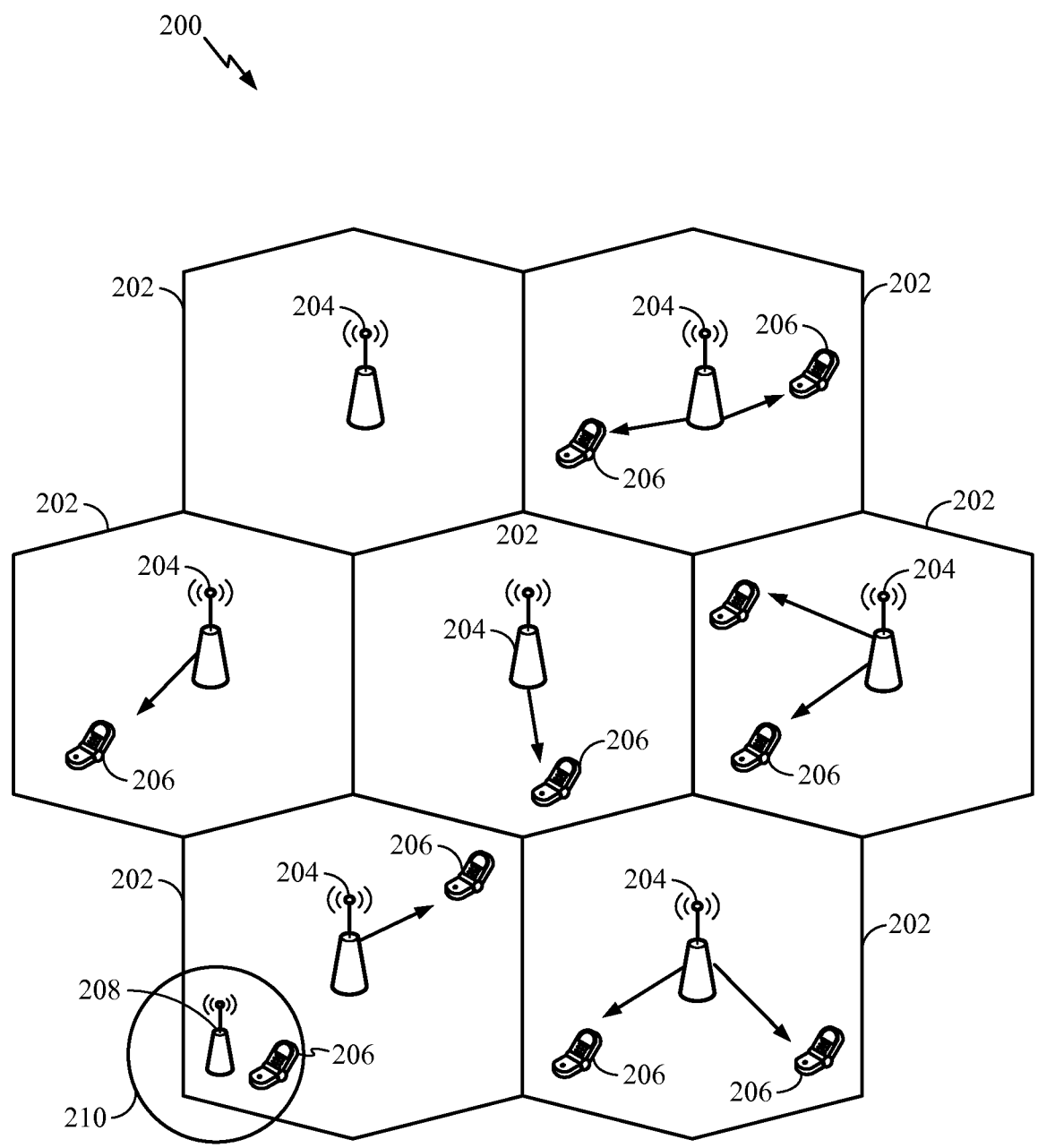
FIG. 2 is a diagram illustrating an example of an access network, in accordance with certain aspects of the present disclosure.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
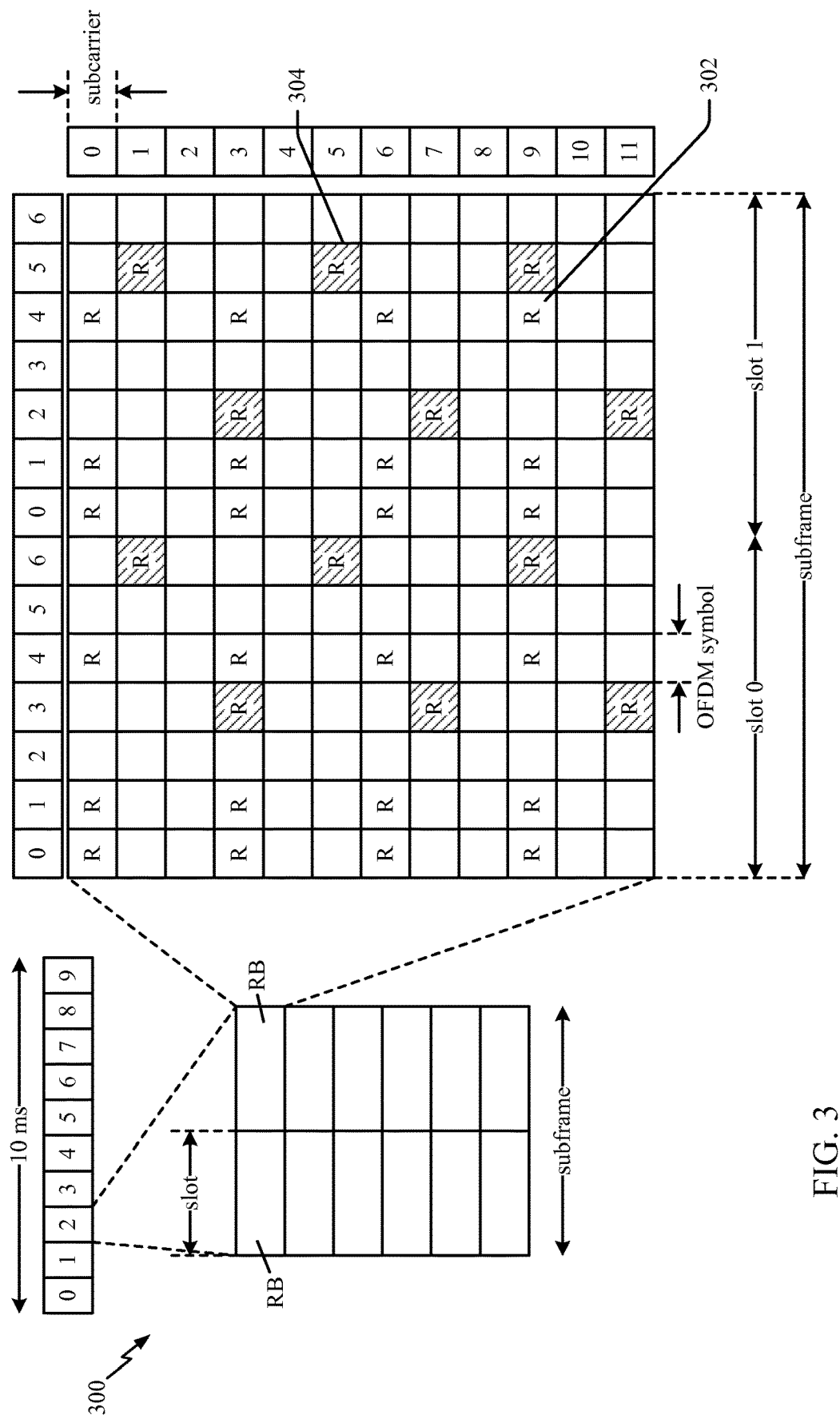
FIG. 3 is a diagram illustrating an example of a downlink (DL) frame structure in long term evolution (LTE), in accordance with certain aspects of the present disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
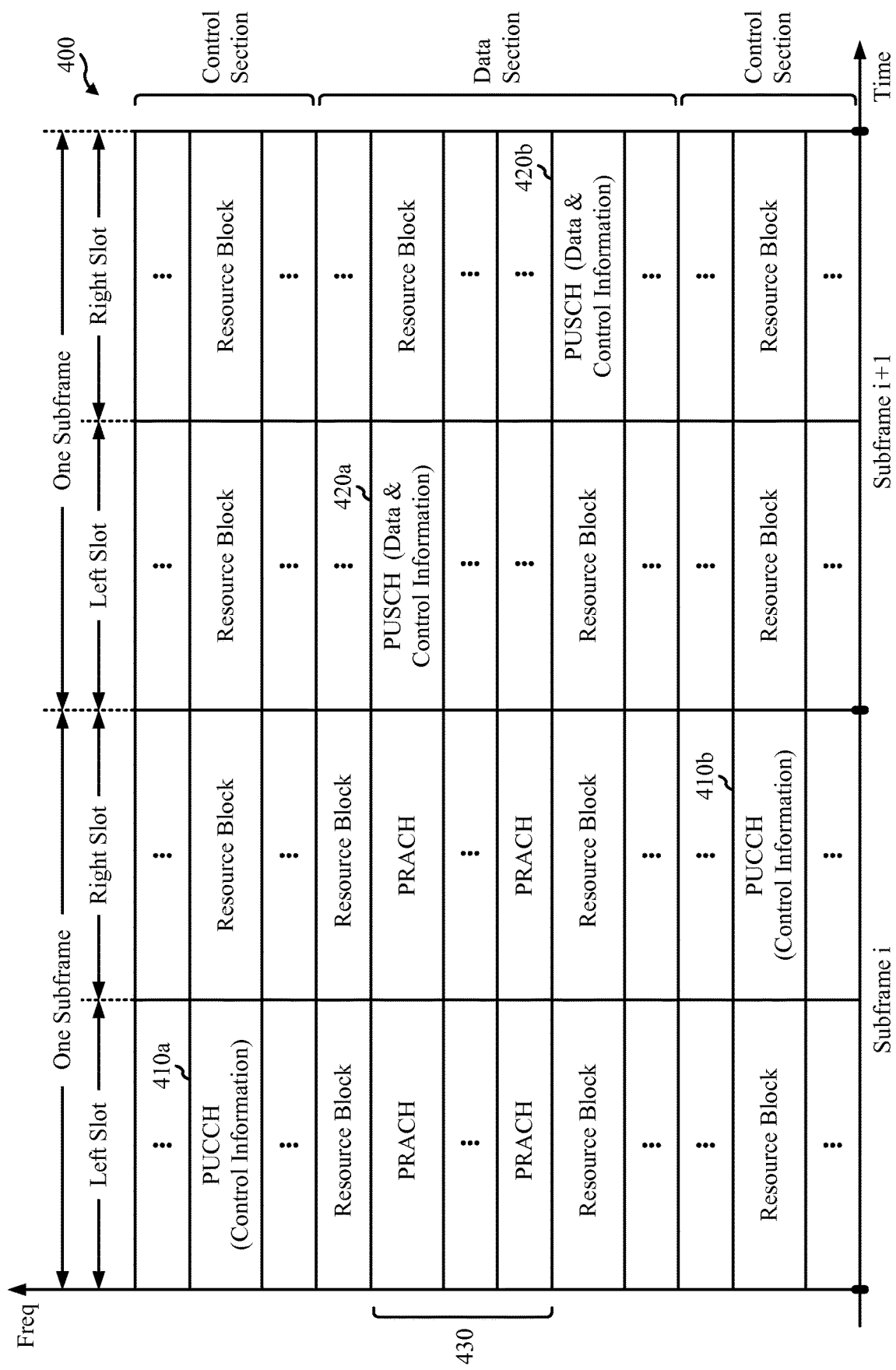
FIG. 4 is a diagram illustrating an example of an uplink (UL) frame structure in LTE, in accordance with certain aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
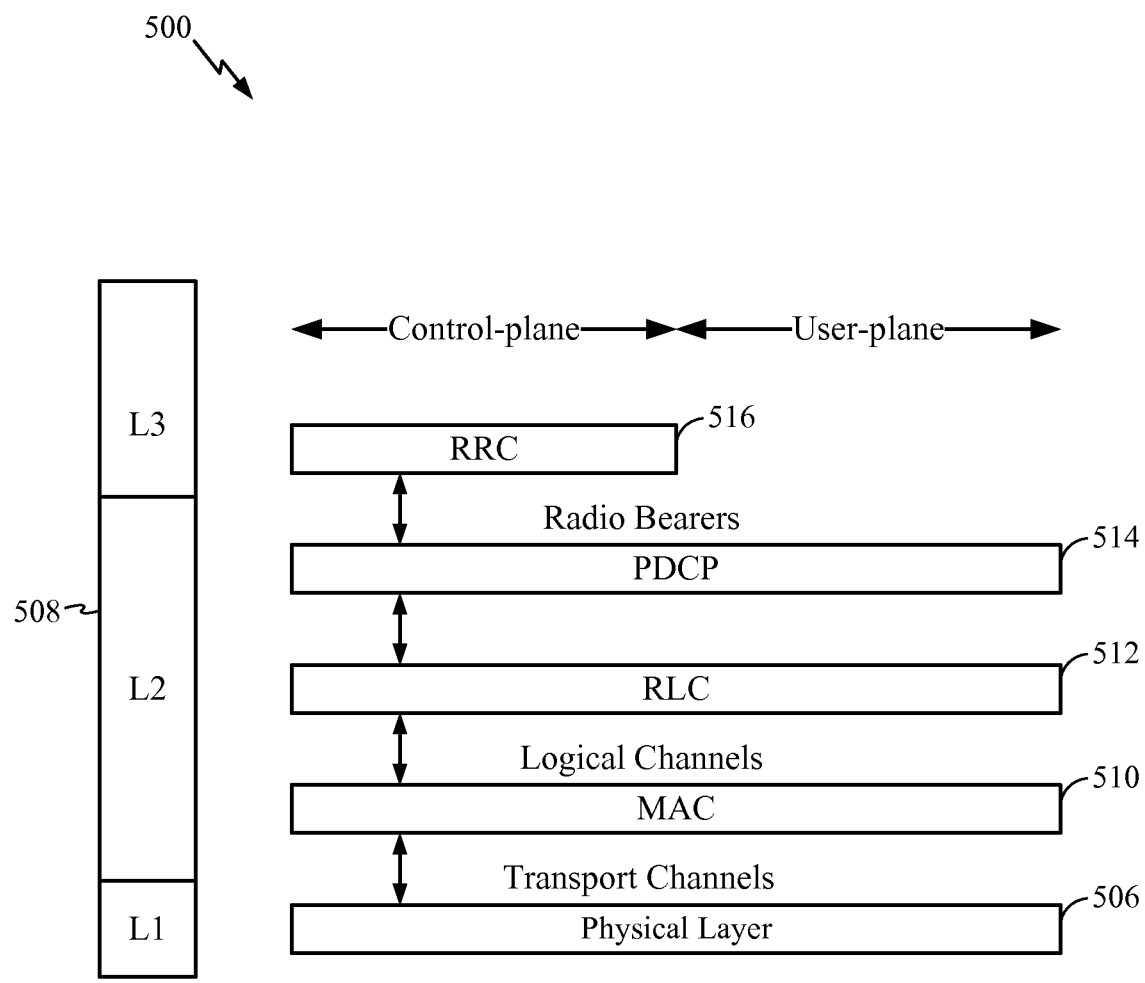
FIG. 5 is a diagram illustrating an example of a radio protocol architecture for the user and control plane, in accordance with certain aspects of the present disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
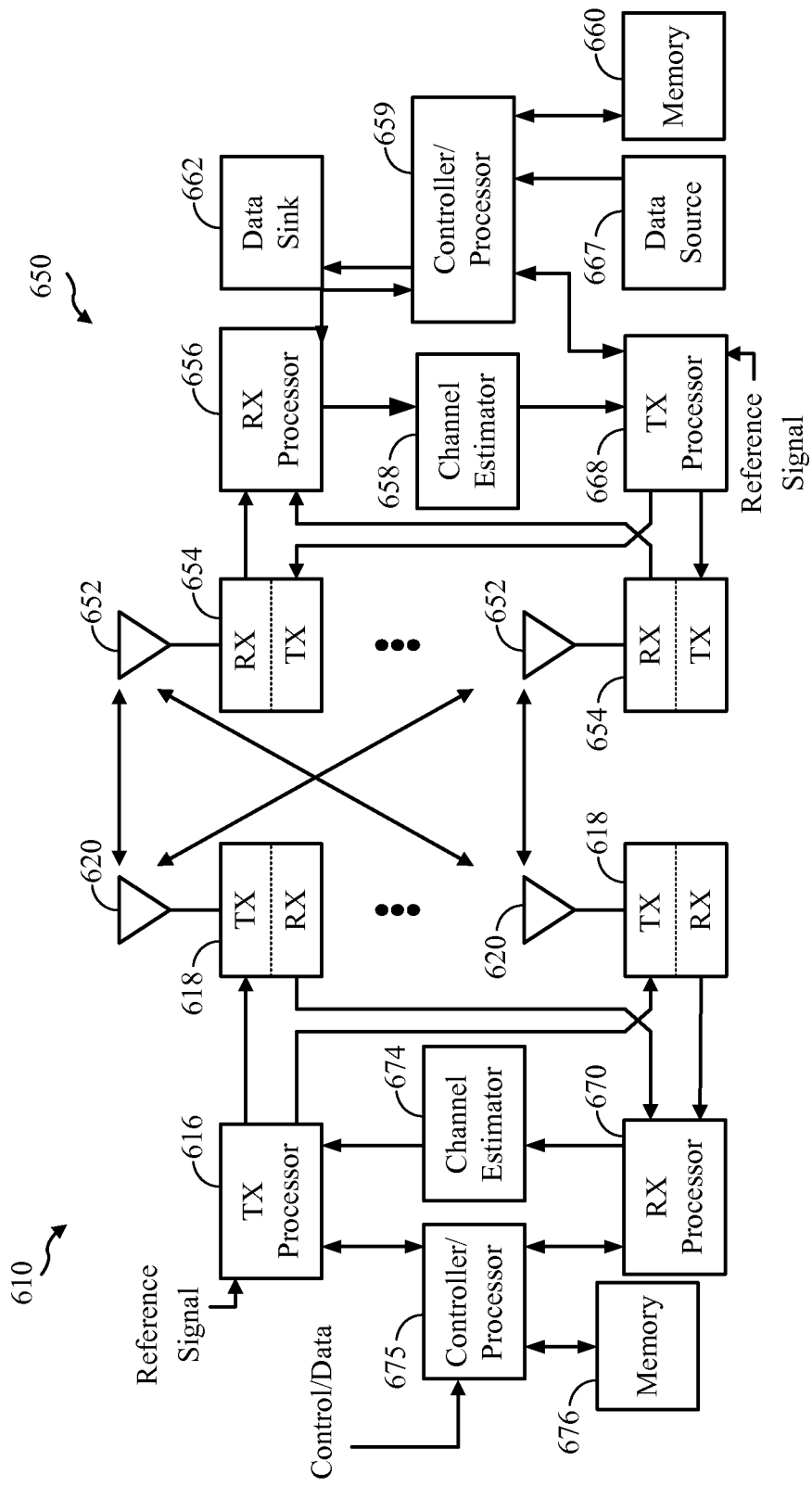
FIG. 6 is a diagram illustrating an example of an evolved Node B (eNB) and user equipment (UE) in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The control/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively. The controller/processor 659 and/or other processors and modules at the UE 650 may perform or direct operations for example operations 700 and 800 in FIGS. 7 and 8 respectively, and/or other processes for the techniques described herein.

In an aspect, UE 650 may be configured with dual SIM capabilities (dual Subscriber Identity Module). In such an aspect, UE 650 (e.g., UE 102, UE 206, etc.) may have dual SIM capabilities and may include two SIM adapters to hold two SIM cards. Dual SIM operation allows use of two services (or networks) operating on different radio frequency (RF) channels by a single UE. In another aspect, Dual SIM operation may allow for use of two or more radio access technologies (RATs) where access to each RAT may be based on a different SIM card.

Example Quick RLC Retransmission on HARQ Failure During Tune Away

Radio tune away is an increasingly common feature in wireless communication systems. Radio tune away may allow for greater functionality and reduced cost in radio frequency (RF) components. Radio tune away may be used in devices supporting Dual Subscriber Identity Module (SIM) Dual Standby (DSDS), Dual SIM Dual Access (DSDA), or Single Radio LTE (SRLTE). A user equipment (UE) (e.g., such as UE 102) may tune away from a first RF to a different means of communication, which may include different air interface technology, different RFs, or air interface related to a different SIM, etc.

Dual SIM Dual Standby (DSDS) UEs can be configured with both SIM cards on standby (i.e., waiting for a call/data connection). When a connection (e.g., call/data) is established on one SIM card, the other SIM card is no longer active. In a Dual SIM configuration, both the SIMs time share one or more of antenna(s), such that only one SIM may use the one or more of antenna(s) at one time. According to the 3GPP standards, while a UE having Dual SIM configuration has an active call on one channel (associated to one of the SIMs), the UE periodically tunes away from this active channel to monitor another channel (associated to the other SIM) to check for calls or data.

Dual SIM Dual Access (DSDA), also referred to as Dual SIM active phones, or dual active phones, however, come with two transceivers, and are capable of receiving calls on both SIM cards.

Single radio LTE (SR-LTE) devices have only one receiver. In SR-LTE devices (e.g., SR-LTE UEs), if the device is connected to an LTE network, the device may perform a full tune away (FTA) from LTE and use RF resources to conduct paging channel monitoring of another radio access technology (RAT) (e.g., GSM or 1×RTT).

Radio tune away may occur while the UE is in an LTE connected state (e.g., connected to eNB 106) providing transport for services, including but not limited to file transfer protocol (FTP), web browsing, etc. The tune away from LTE may affect performance, for instance throughput of the UE, especially when compared to UEs that do not tune away. In certain applications, such as carrying internet traffic over transmission control protocol (TCP), increased round trip time (RTT) may increase tune away induced performance degradation.

For example, a UE radio link control (RLC) may transmit a protocol data unit (PDU) with sequence number SN=0 on an uplink transport block. During the transmission or subsequent hybrid automatic repeat request (HARQ) retransmission, a tune away may occur. The tune away may reduce the effectiveness of the transmission and may result in uplink (UL) transmission failure at the physical layer. The physical layer failure may be detected and recovered by the RLC layer at the receiving eNB. Detection typically occurs if and when the eNB RLC receives the next RLC sequence number SN=1. The eNB may then run an ordering timer, typically in the range of 40-50 ms, before the eNB may declare SN=0 failed to transmit. The eNB may send an RLC status PDU to the UE requesting the UE retransmit SN=0. When the eNB successfully receives the retransmitted SN=0, the eNB may finally be able to deliver the RLC service data units (SDUs) carried in SN=0 and SN=1 to the upper layer. In this possible scenario, the tune away may add a delay of at least 40-50 ms to the RTT. In a case where Transport Control Protocol (TCP) throughput is a function of transmission window and RTT, an increase in RTT may have a disproportionate negative effect on performance.

Certain aspects of the present invention described herein may include possible detection of the condition, a mitigating mechanism, and additional aspects to consider in fine-tuning the mechanism.

According to certain aspects, tune away may occur during HARQ communications, for example in the middle of a HARQ transmission or retransmission. In some cases, the UE may be requested by the serving eNB to exhaust the UE's last HARQ retransmission. In this event, the HARQ may be considered (e.g., assumed by the UE) to have failed, and the RLC may be notified of the failure so that recovery may be triggered. In order to mitigate the negative effects of this occurrence, the UE may attempt (e.g., autonomously) to re-transmit, at the RLC level, all the PDUs that were carried on the transport block corresponding to the failed (or assumed failed) HARQ transmission or retransmission. This may ensure that the PDUs that were potentially lost during the tune away period are retransmitted as soon as an UL grant becomes available to the UE. According to certain aspects, the UE retransmits the packets without first receiving a request or feedback from the eNB.

Figure 7:
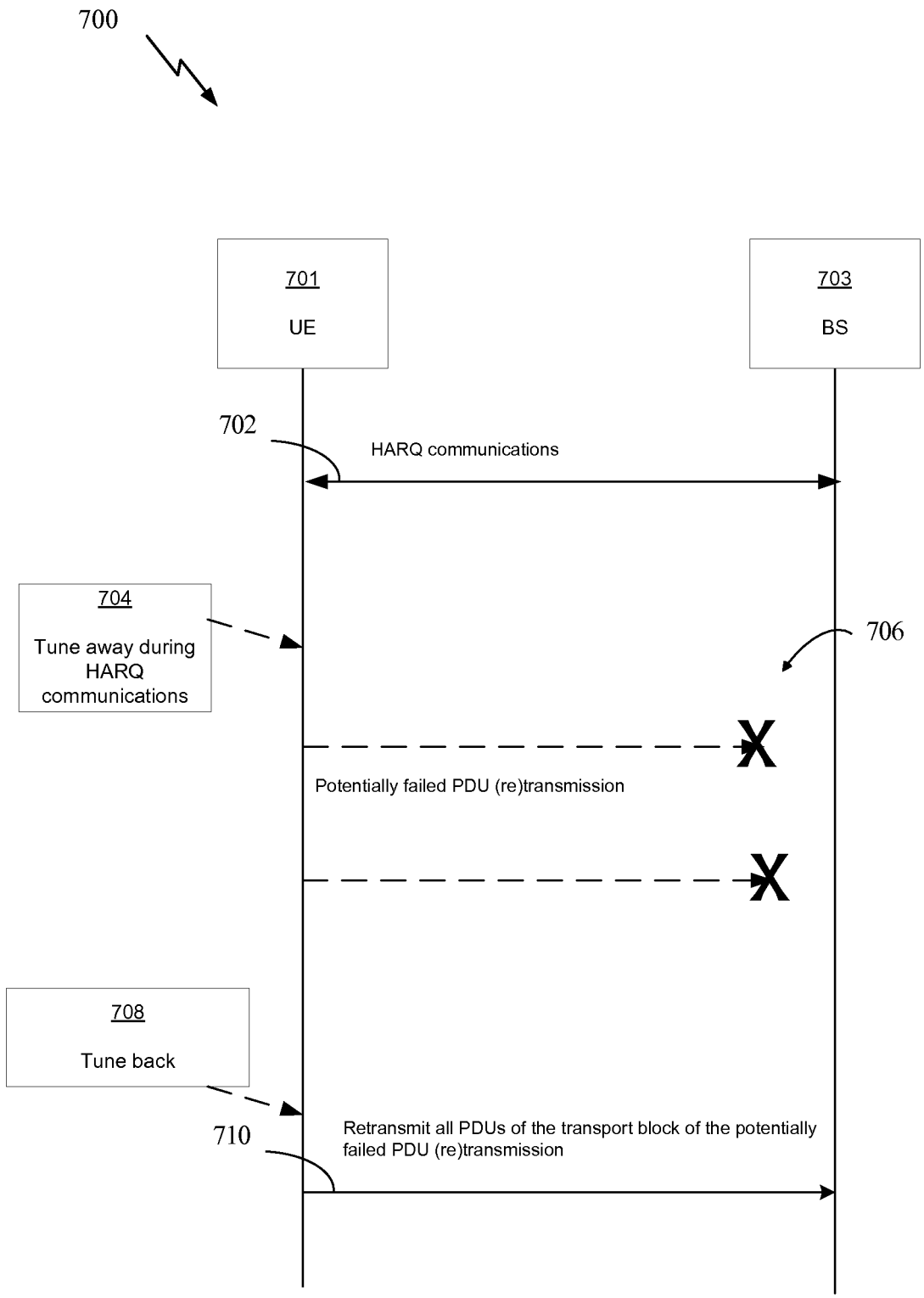
FIG. 7 illustrates an example call flow for quick radio link control (RLC) retransmission on hybrid automatic repeat request (HARQ) failure during tune away, in accordance with certain aspects of the present disclosure.

FIG. 7 illustrates an example call flow for quick RLC retransmission on HARQ failure during tune away, in accordance with certain aspects of the present disclosure. As shown in FIG. 7, at 702, the UE 701 may perform HARQ communications with the BS 703. Then, at 704, the UE 701 may tune away during the HARQ communications. According to certain aspects, the UE 701 may tune away to another base station, a different air interface technology, a different radio frequency, an air interface related to a different SIM, etc. As a result, at 706, certain PDU transmissions or retransmissions may have failed (or be assumed to have failed). At 708, the UE 701 may tune back to base station 703. According to certain aspects, the UE 701 may assume certain PDU transmissions or retransmission have failed, and at 710, the UE 701 may retransmit all PDUs of the transport block of the potentially failed PDU transmission or retransmission.

According to certain aspects, for each transport block during a HARQ process, the UE may track all RLC PDUs on the transport block. For example, the tracking may include information such as which Logical Channel ID (LC_ID) the PDU belongs to and whether the PDU is a control PDU or a data PDU. For data PDUs, the UE may track the sequence number of the data PDUs, and for segmented data PDUs, the segment offset and payload size. Tracking this information may facilitate effective autonomous retransmission of the RLC PDUs.

According to certain aspects, in the case of an acknowledgment mode (AM) radio bearer, the control PDU may be retriggered. The retransmitted PDU may be put up for retransmission again, and the new PDU may also be put up for retransmission.

According to certain aspects, in the case of an Unacknowledge Mode (UM) radio bearer, UM PDUs may be ignored as UM radio bearers typically do not retransmit PDUs. Alternatively, in order to enhance reliability, UM bearer PDUs may be retransmitted. Since there may be no fragment PDU for UM, extra care may be used to ensure there is sufficient grant to carry the UM PDU.

According to certain aspects, because the RLC retransmissions may have been autonomous (e.g., not requested by the eNB, not governed by T-Poll_retx time expiry, etc.) to the UE may not count this type of retransmission for an RLC retransmit counter. According to certain aspects, the UE may ignore an RLC NACK from the eNB if the UE identifies that the particular nacked PDU, due to early retransmission, is under HARQ retransmission.

According to certain aspects, since duplication detection may allow RLC receivers to handle duplicate PDUs, and due to RTTs effect on overall system throughput, it may be acceptable to reduce the RTT, in the context of tune away, at the expense of duplicating PDUs.

Figure 8:
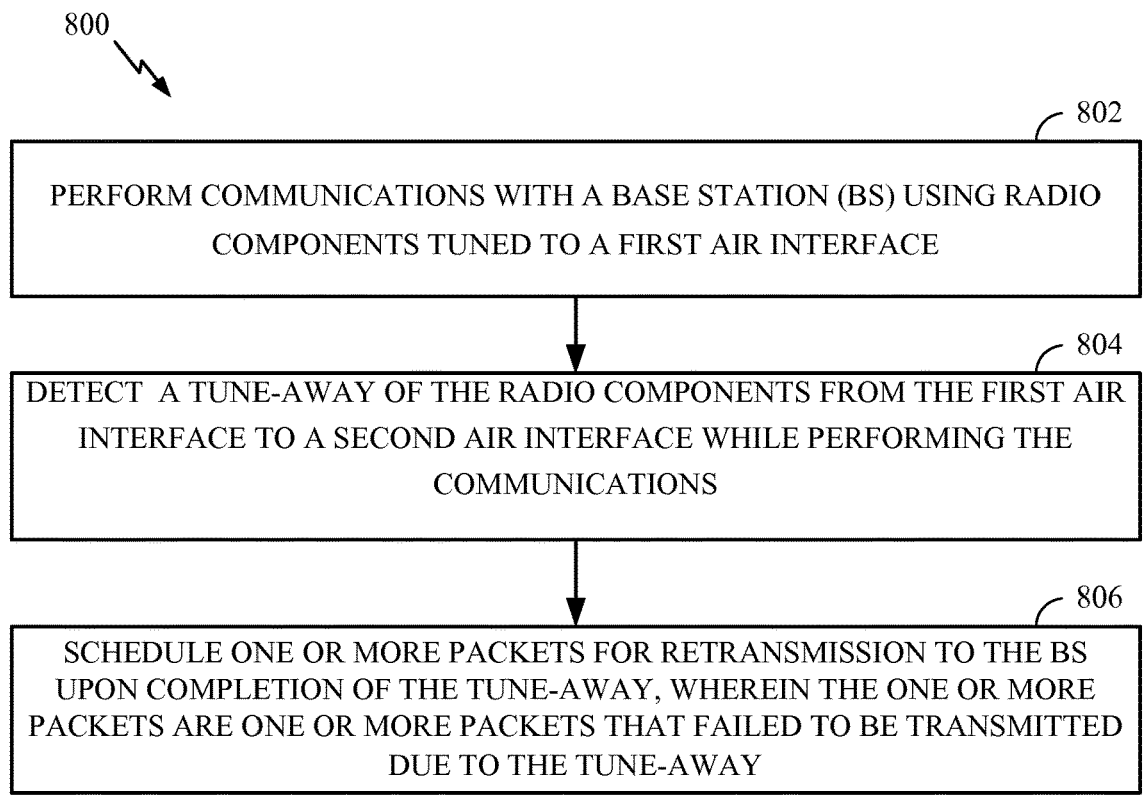
FIG. 8 illustrates example operations for wireless communications, in accordance with certain aspects of the present disclosure.

FIG. 8 illustrates example operations 800 for wireless communications, in accordance with aspects of the present disclosure. The operations 800 may be performed, for example, by a UE (e.g., UE 102). The operations 800 may begin, at 802, by performing communications (e.g., HARQ communications) with a BS using radio components tuned to a first air interface.

According to certain aspects, the UE may track (e.g., during the HARQ communications), at a RLC layer, one or more PDUs that were carried on a transport block. For example, the UE may track the Logical Channel ID (LC_ID) of the one or more PDUs and whether the one or more PDUs are data PDUs or control PDUs. The UE may also track sequence number, segment offset, and payload size of the data PDUs.

At 804, the UE may detect a tune-away of the radio components from the first air interface to a second air interface while performing the communications. According to certain aspects, the first air interface may be associated with a first SIM of the UE and the second air interface is associated with a second SIM of the UE. Alternatively, the first air interface may be associated with a first RAT and the second air interface may be associated with a second RAT.

At 806, the UE may schedule one or more packets for retransmission to the BS upon completion of the tune-away, wherein the one or more packets are one or more packets that failed to be transmitted due to the tune-away. For example, the UE may transmit, at a RLC layer, one or more PDUs that were carried on a transport block whose transmission is assumed to have failed due to the tune-away. According to certain aspects, the UE may retransmit the one or more HARQ packets on an UM radio bearer.

According to certain aspects, the UE may also maintain a retransmission counter used to determine a quality of a link between the UE and the BS and not increment the retransmission counter for the autonomous retransmission.

According to certain aspects, the UE may also receive a RLC NACK from the BS within a time period after the schedule transmission of the one or more packets, determine the RLC NACK corresponds to a packet of the one or more packets, and not generate a response to the RLC NACK based on the determination.

Figure 8A:
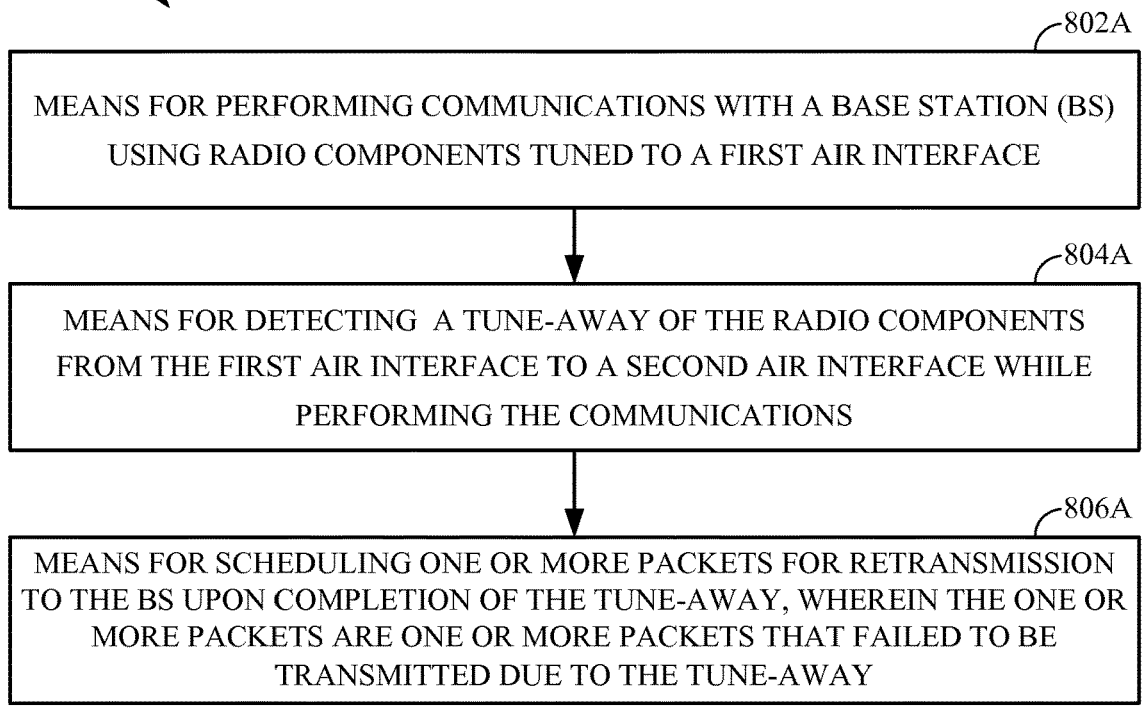
FIG. 8A illustrates example means capable of performing the operations shown in FIG. 8, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 800 illustrated in FIG. 8 correspond to means 800A illustrated in FIG. 8A.

For example, means for transmitting may comprise a transmitter and/or an antenna(s) 620 of the UE 610) or antenna(s) 652 of the eNB 650. Means for receiving may comprise a receiver and/or an antenna(s) 620 of the UE 610) or antenna(s) 652 of the eNB 650. Means for determining, means for maintaining, means for tracking, means for performing, means for scheduling, and detecting may comprise a processing system, which may include one or more processors, for example, any of the processors shown in FIG. 6 of the UE (e.g., UE 610) or network entity (e.g., eNB 650).

According to certain aspects, such means may be implemented by processing systems configured to perform the corresponding functions by implementing various algorithms (e.g., in hardware or by executing software instructions). For example, an algorithm for performing communications with a BS using radio components tuned to a first air interface, detecting a tune-away of the radio components from the first air interface to a second air interface while performing the communications, and scheduling one or more packets for transmission to the BS upon completion of the tune-away, wherein the one or more packets are one or more packets that failed to be transmitted due to the tune-away.

The various algorithms may implemented by a computer-readable medium that may be a non-transitory computer-readable medium. The computer-readable medium may have computer executable instructions (e.g., code) stored thereon. For example, the instructions may be executed by a processor or processing system of the UE (e.g., UE 610) or network entity (e.g., eNB 650) and stored in a memory of the UE (e.g., UE 610) or network entity (e.g., eNB 650). For example, the computer-readable medium may have computer executable instructions stored thereon for performing communications with a BS using radio components tuned to a first air interface, detecting a tune-away of the radio components from the first air interface to a second air interface while performing the communications, and scheduling one or more packets for retransmission to the BS upon completion of the tune-away, wherein the one or more packets are one or more packets that failed to be transmitted due to the tune-away.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication by a user equipment (UE), comprising:
    performing hybrid automatic repeat request (HARQ) communications with a base station (BS) using radio components tuned to a first air interface;
    detecting a tune-away of the radio components from the first air interface to a second air interface while transmitting one or more protocol data units (PDUs) of a HARQ packet; and
    based on completion of the tune-away, autonomously attempting retransmission of the one or more PDUs of the HARQ packet without waiting for feedback from the BS.

2. The method of claim 1, wherein the first air interface is associated with a first Subscriber Identity Module (SIM) of the UE and the second air interface is associated with a second SIM of the UE.

3. The method of claim 1, wherein the first air interface is associated with a first radio access technology (RAT) and the second air interface is associated with a second RAT.

4. The method of claim 1, wherein the one or more PDUs of the HARQ packet are scheduled for retransmission at a radio link control (RLC) layer.

5. The method of claim 1, further comprising: retransmitting the one or more PDUs of the HARQ packet to the BS on an unacknowledged mode (UM) radio bearer.

6. The method of claim 1, further comprising:
    maintaining a retransmission counter used to determine a quality of a link between the UE and the BS; and
    not incrementing the retransmission counter for the scheduled retransmissions of the one or more PDUs of the HARQ packet.

7. The method of claim 1, further comprising:
    receiving a radio link control (RLC) negative acknowledgment (NACK) from the BS within a time period after the scheduled retransmissions of the one or more PDUs of the HARQ packet;
    determining the RLC NACK corresponds to the HARQ packet; and
    determining not to generate a response to the RLC NACK based on the determination.

8. The method of claim 1, further comprising:
    tracking, at a radio link control (RLC) layer, the one or more PDUs, where the HARQ packet comprises a transport block including the one or more PDUs.

9. The method of claim 8, wherein tracking the one or more PDUs comprises:
    tracking at least one of: the Logical Channel ID (LCID) of the one or more PDUs or whether the one or more PDUs comprise data PDUs or control PDUs.

10. The method of claim 9, wherein tracking the one or more PDUs further comprises:
tracking at least one of: sequence number, segment offset, or payload size of data PDUs.

11. An apparatus for wireless communication by a user equipment (UE), comprising:
means for performing hybrid automatic repeat request (HARQ) communications with a base station (BS) using radio components tuned to a first air interface;
means for detecting a tune-away of the radio components from the first air interface to a second air interface while transmitting one or more protocol data units (PDUs) of a HARQ packet; and
means for, based on completion of the tune-away, autonomously attempting retransmission of the one or more PDUs of the HARQ packet without waiting for feedback from the BS.

12. The apparatus of claim 11, wherein the first air interface is associated with a first Subscriber Identity Module (SIM) of the UE and the second air interface is associated with a second SIM of the UE.

13. The apparatus of claim 11, wherein the first air interface is associated with a first radio access technology (RAT) and the second air interface is associated with a second RAT.

14. The apparatus of claim 11, wherein the one or more PDUs of the HARQ packet are scheduled for transmission at a radio link control (RLC) layer.

15. The apparatus of claim 11, further comprising means for retransmitting the one or more PDUs of the HARQ packet to the BS on an unacknowledged mode (UM) radio bearer.

16. The apparatus of claim 11, further comprising:
means for maintaining a retransmission counter used to determine a quality of a link between the UE and the BS, wherein means maintaining the retransmission counter does not increment the retransmission counter for the scheduled retransmissions of the one or more PDUs of the HARQ packet.

17. The apparatus of claim 11, further comprising:
means for receiving a radio link control (RLC) negative acknowledgment (NACK) from the BS within a time period after the retransmissions of the one or more PDUs of the HARQ packet;
means for determining the RLC NACK corresponds to the HARQ packet; and
means for determining not to generate a response to the RLC NACK based on the determination.

18. The apparatus of claim 11, further comprising:
means for tracking, at a radio link control (RLC) layer, the one or more PDUs of the HARQ packet, wherein the HARQ packets comprises a transport block including the one or more PDUs.

19. The apparatus of claim 18, wherein tracking the one or more PDUs comprises:
tracking at least one of: the Logical Channel ID (LCID) of the one or more PDUs or whether the one or more PDUs comprise data PDUs or control PDUs.

20. The apparatus of claim 19, wherein tracking the one or more PDUs further comprises:
tracking at least one of: sequence number, segment offset, or payload size of data PDUs.

21. An apparatus for wireless communication by a user equipment (UE), comprising:
at least one processor configured to: perform hybrid automatic repeat request (HARQ) communications with a base station (BS) using radio components tuned to a first air interface;
detect a tune-away of the radio components from the first air interface to a second air interface transmitting one or more protocol data units (PDUs) of a HARQ packet; and
based on completion of the tune-away, autonomously attempt retransmission of the one or more PDUs of the HARQ packet without waiting for feedback from the BS; and
a memory coupled with the at least one processor.

22. The apparatus of claim 21, wherein the first air interface is associated with a first radio access technology (RAT) and the second air interface is associated with a second RAT.

23. The apparatus of claim 21, wherein the one or more PDUs of the HARQ packet are scheduled for transmission at a radio link control (RLC) layer.

24. A non-transitory computer readable medium having computer executable code stored thereon for:
performing hybrid automatic repeat request (HARQ) communications with a base station (BS) using radio components tuned to a first air interface; detecting a tune-away of the radio components from the first air interface to a second air interface transmitting one or more protocol data units (PDUs) of a HARQ packet; and
based on completion of the tune-away, autonomously attempting retransmission of the one or more PDUs of the HARQ packet without waiting for feedback from the BS.

25. The method of claim 1, wherein autonomously attempting retransmission of the one or more PDUs of the HARQ packet to the BS further comprises:
attempting the retransmission of the one or more PDUs of the HARQ packet without waiting for expiry of a timer associated with the one or more PDUs of the HARQ packet.

* * * * *